United States Patent
Hammond et al.

[11] 3,756,689
[45] Sept. 4, 1973

[54] ELECTRONICALLY TUNABLE ACOUSTO-OPTIC FILTER HAVING SELECTED CRYSTAL ORIENTATION

[75] Inventors: Donald L. Hammond, Los Altos Hills; John A. Kusters, San Jose; David A. Wilson, Palo Alto, all of Calif.

[73] Assignee: Hewlett-Packard Company, Palo Alto, Calif.

[22] Filed: Nov. 17, 1971

[21] Appl. No.: 199,705

[52] U.S. Cl. .................. 350/149, 350/157, 350/161
[51] Int. Cl. ............................................. G02f 1/24
[58] Field of Search .................. 350/147, 149, 150, 350/157, 160, 161

[56] References Cited
UNITED STATES PATENTS
3,679,288 7/1972 Harris ............................ 350/149
3,591,813 7/1971 Coquin et al. .................. 350/161
3,637,288 1/1972 Seidel ............................ 350/149

*Primary Examiner*—John K. Corbin
*Attorney*—Roland I. Griffin

[57] ABSTRACT

A birefringent crystal is provided for an electronically tunable acousto-optic filter wherein a light beam is diffracted by a collinear acoustic wave in the birefringent crystal from a first polarization into an orthogonal polarization, the crystal orientation being such that the effect due to birefringence changes is balanced by the effect due to acoustic anisotropy, providing a filter with high resolution and large optical apertures. For a filter employing a quartz crystal, a crystal cut is utilized wherein the longitudinal axis of the filter medium lies along a crystal orientation of approximately $(zyw) - 11.2°$; for a lithium niobate crystal, the cut is $(zyw)$ $4.0°$.

26 Claims, 10 Drawing Figures

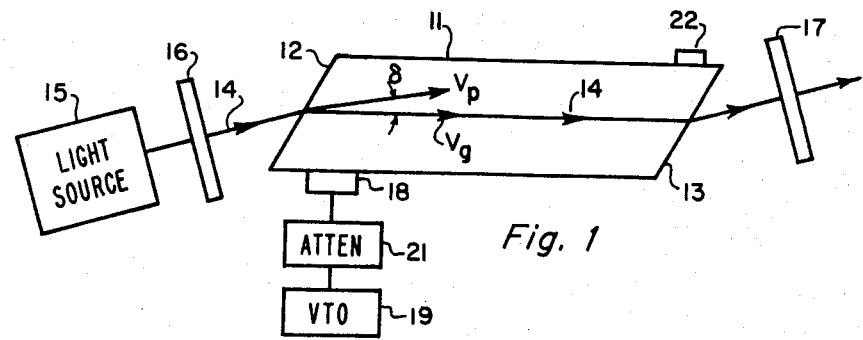
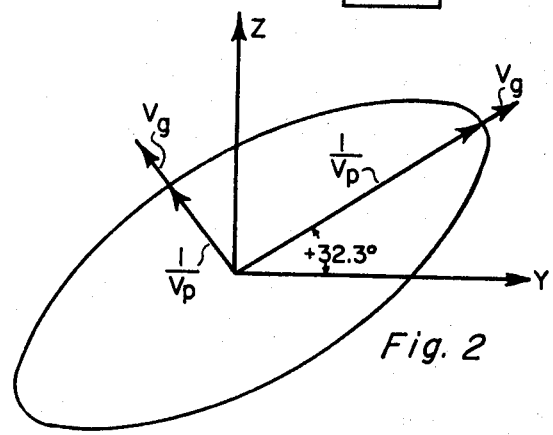
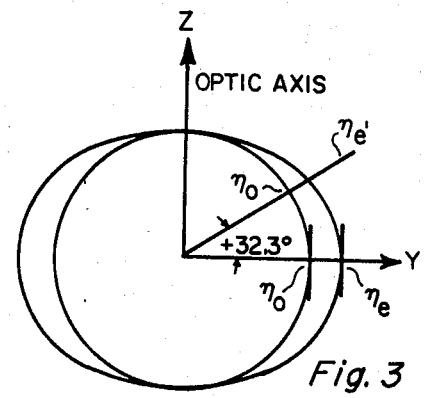
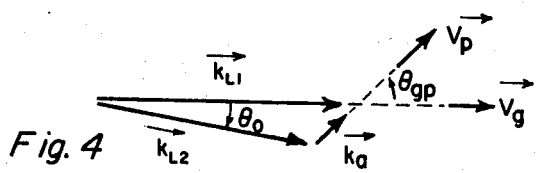
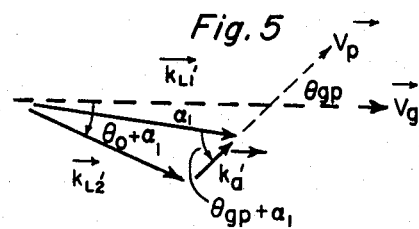
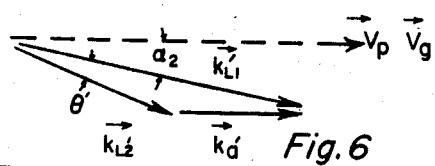
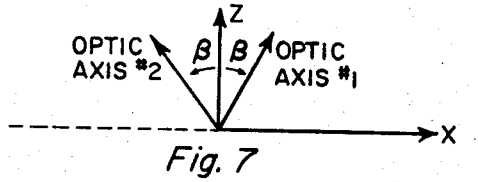
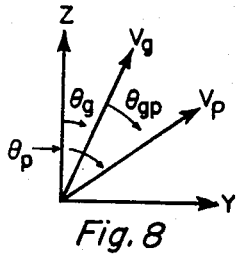
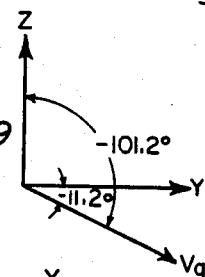
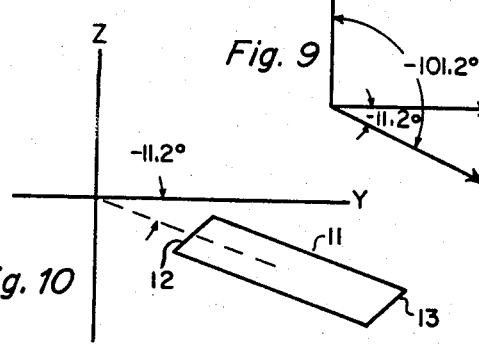
INVENTORS
DONALD L. HAMMOND
JOHN A. KUSTERS
DAVID A. WILSON
BY Roland S. Griffin
ATTORNEY

ELECTRONICALLY TUNABLE ACOUSTO-OPTIC FILTER HAVING SELECTED CRYSTAL ORIENTATION

BACKGROUND OF THE INVENTION

Electronically tunable acousto-optical filters have been constructed wherein light of a first polarization traveling collinearly with an acoustical wave through an optically anisotropic medium, such as a birefringent crystal, is diffracted from the first polarization into a second polarization and wherein the light of the second polarization may be separated from that of the first polarization at the output. The frequencies of the acoustic wave and the optical wave are related such that the bandpass characteristics of the acousto-optic filter may be changed or tuned over a range of optical frequencies by varying the frequencies of the acoustic wave.

As explained in a patent application entitled "Electronically Tunable Acousto-optic Filter Having Improved Light and Acoustic Wave Interaction," Ser. No. 101,622, filed on Dec. 28, 1970, by John A. Kusters, and issued as U.S. Pat. No. 3,687,521 on Aug. 29, 1972 the interaction between the acoustic and the optical waves is optimized when the two waves maintain collinearity over an appreciable distance of travel through the filter. In many anisotropic media the phase velocity vector of the acoustic wave and the group velocity vector of the acoustic wave are at an appreciable angle to one another, and thus these two wave vectors cannot be simultaneously collinear with the optical wave. As described in U.S. Pat. No. 3,687,521, the filter is so constructed that the group velocity vector of the acoustic wave is collinear with the optical wave traveling along the principal axis of the filter, and the phase velocity vector of the acoustic wave extends off at an angle relative to the principal axis. Although this prior art arrangement is preferable to that in which the phase velocity vector of the acoustic wave is aligned with the optical wave in such anisotropic media, it still provides a tilted acoustic wave front in the filter and, except for instances in which the optical beam is collimated to a high degree, the bandwidth of the filter is undesirably broadened. It is desirable to increase the usable optical aperture angle and to improve the resolution, i.e., narrow the bandwidth, of such acousto-optical filters.

A first approach is to utilize a filter medium in which the phase velocity vector and the group velocity vector of the acoustical wave are in alignment such that both of these acoustic vectors will be aligned with the optical wave traveling through the medium. In the case of a quartz crystal, an important filter medium in that it may be used in both the visible and ultraviolet regions of the spectrum, the phase and group velocity vectors of the acoustic wave traveling therethrough will be collinear when the direction of travel is aligned with the X-axis of the crystal structure. In this instance, the acoustic wave employed is a longitudinal wave as contrasted with the shear wave utilized with a Y-bar quartz crystal filter such as that described in U.S. Pat. No. 3,687,521. A filter utilizing such a longitudinal mode is handicapped by the need for relatively high acoustic frequencies since the longitudinal acoustic velocity is approximately twice that of the shear acoustic velocity. In addition, since the acoustic power required to operate the filter is substantially proportional to the acoustic velocity cubed, the power requirement is increased by about a factor of eight. Thus, by utilizing an X-bar crystal orientation in lieu of a Y-bar orientation, an increased optical aperture and a narrower bandwidth are obtained only with a sacrifice in power and acoustic frequency. In addition, when utilizing the shear mode and reflecting off the input face into collinearity with the optical beam, essentially a 100 percent conversion of the acoustic wave is obtained. In a filter employing the longitudinal mode acoustic wave, the conversion efficiency is about half and thus an even higher acoustic power input is required. In quartz, therefore, it is desired to operate with a shear acoustic wave with the optical and acoustic waves being directed along a Y-bar orientation of the crystal, and some other approach is needed for improving the optical and acoustic wave interaction.

SUMMARY OF THE INVENTION

In the present invention a novel method and apparatus is provided for utilizing a crystal orientation for the anisotropic medium in an acousto-optic filter whereby enhanced resolution and improved optical aperture angles are obtained and wherein reasonable values of acoustic frequency and power are required.

In general, it is desired to employ a crystal orientation in the Y–Z plane so that the shear acoustic wave may be employed rather than the longitudinal wave. The orientation desired is such that the phase velocity vector and the group velocity vector of the acoustic wave along the particular orientation approach collinearity so that the problems encountered with a tilted wave front are substantially eliminated. It has been found, however, that in approaching this idealized orientation in a quartz filter medium, the optical birefringence of the filter medium varies rapidly with the light propagation direction, thereby seriously degrading the resolution, i.e., increasing the bandwidth for all but very small optical aperture angles. Thus, although one gains from the collinearity of the acoustic phase and velocity vectors, one loses by the change in birefringence, and thus optimum results are not obtained.

It has been discovered, however, that certain crystal orientations exist where the effect of the birefringence change is cancelled out by the effect due to acoustic anisotropy so that an acousto-optical filter with improved high resolution and relatively large optical aperture angles is obtained. For example, in the case of a quartz filter, excellent results have been obtained with the optical and acoustic energy being propagated through the quartz cut with its major axis in the Y–Z plane and oriented in a direction at an angle approximately $-11.2°$ to the Y-axis.

DESCRIPTION OF THE DRAWINGS

FIG. 1 is a schematic diagram of a typical prior art acousto-optic filter device in which the major axis of the filter lies along the Y-axis of the crystal in the Y–Z plane.

FIG. 2 is an acoustic velocity propagation plot for quartz in the Y–Z plane.

FIG. 3 is an illustration of the indices of refraction of light in a quartz crystal in the Y–Z axis.

FIGS. 4, 5, and 6 are $k$-vector diagrams for different light directions in the crystal.

FIG. 7 illustrates the two-optic axes symmetric with the Z-axis in a biaxial crystal.

FIGS. 8 and 9 illustrate the acoustic wave group velocity vector angles in a quartz crystal.

FIG. 10 is a diagram illustrating the cut of quartz with an optical transmission axis oriented to provide optimized aperture angle and resolution.

DESCRIPTION OF THE PREFERRED EMBODIMENTS

Referring now to FIG. 1, there is shown in schematic form a typical acousto-optic filter of the type described in the above-cited U.S. Pat. No. 3,687,521. This filter comprises a suitable anisotropic medium 11, for example, a birefringent quartz crystal, provided with angled input and output end surfaces 12 and 13, respectively. The medium 11 is oriented with the longitudinal axis through the filter aligned with the Y-axis of the quartz crystal, the Z-axis of the quartz crystal extending in a vertical direction.

The optical beam 14 from a source 15, for example, ultraviolet light in the case of the quartz medium, is transmitted into the body 11 through the input surface 12, the input surface being preferably cut at Brewster's angle to minimize transmission reflection losses. The optical beam passes along the Y-axis of the body 11 and exits through the output end 13. This light is polarized in a first direction along the Z-axis by a vertical linear polarizer 16. A horizontal linear polarizer 17 is located at the output to separate the light exiting with polarization along the Z-axis from the orthogonally polarized light produced by the diffraction in the medium 11.

An acoustical transducer 18 is mounted in intimate contact with the crystal 11 and is connected to a suitable signal generator or source 19 such as a voltage tunable oscillator, the frequency of which can be varied by varying the input voltage applied thereto. The transducer 18 may be of any suitable type, for example, an X-cut lithium niobate transducer. The RF output of the voltage tunable oscillator 19 is fed via an adjustable attenuator 21 to the acoustic transducer 18 for generating an acoustic shear wave which is internally reflected from the input face 12 of the crystal 11 and propagated collinearly along the Y-axis of the crystal 11 with the optical wave.

For a particular combination of light wave and acoustic wave frequencies, there is found to be a strong interaction between the light and the acoustic wave in which the acoustic wave diffracts the light wave from the polarization orientation of the input beam into the orthogonal polarization. This yields a narrow pass band of light of orthogonal polarization which is then separated from the input light beam by horizontal linear polarizer 17. This narrow pass band of light is a function of the applied acoustical frequency and can therefore be varied in frequency by varying the frequency of excitation supplied by the voltage tunable oscillator 19. The acoustic shear wave is reflected off the end face 13 and absorbed by acoustic absorber 22.

This collinear diffraction occurs as a cumulative effect for a very narrow band of light frequencies, and it is noncumulative by incremental self-cancellation for other frequencies. The cumulative diffraction effect occurs when the momentum vectors of the incident light and acoustic waves satisfy the relation that their sum equals that of the output light beam. This condition is called "phase-matching" and occurs when the diffraction-generated polarization travels at the same velocity as the free electromagnetic wave. A narrow band of frequencies satisfying this relation and diffracted into the orthogonal polarization is then passed by the output polarizer 17 while the light of the initial polarization is blocked. If desired, the output polarizer 17 may be polarized in the Z direction to pass the non-diffracted light and block the diffracted light.

Diffraction into the orthogonal polarization occurs via the photoelastic effect, and is only cumulative if: $\vec{k_o} - \vec{k_e} = \vec{k_a}$ where the subscripts $o$, $e$, and $a$ denote the ordinary light wave, the extraordinary light wave, and the acoustic wave, respectively. This will be the case if the light and acoustic frequencies $f_o$ and $f_a$ are related by:

$$f_o = c\, f_a / V |\Delta n| \qquad (1)$$

where $c/V$ is the ratio of the light velocity in vacuum to the acoustic group velocity in the medium, and $\Delta n$ is the birefringence of the crystal.

As more fully described in the above-cited U.S. Pat. No. 3,687,521, the face angle of input surface 12 is so chosen that the group velocity vector $V_g$ of the acoustic wave is aligned with the longitudinal axis of the crystal, whereas the phase velocity vector $V_p$ extends off at an angle thereto. Aligning the group velocity vector with the optical beam enhances the interaction between the two waves through the medium.

However, because of the tilted wave front of the phase velocity vector $V_p$, the incoming optical beam must be well collimated to obtain the desired resolution. As the optical aperture angle increases, the bandwidth of the filter increases and thus resolution is degraded. In order to improve the resolution of the filter and to increase the usable optical aperture, it is desirable that the phase velocity and the group velocity of the acoustic wave be brought into closer collinearity and it would thus appear that the proper approach should be to determine a crystal cut wherein the group velocity and phase velocity vectors are collinear along the longitudinal axis of the filter. This approach leads to various problems with the birefringence of the filter as more fully described below and requires additional modifications. As stated above, it is most desirable to work with the shear mode of the acoustic wave for acoustic frequency and power considerations and thus the crystal orientation selection is made with this condition in mind.

Referring to FIG. 2, there is shown an illustration of the acoustic propagation in the Y-Z plane of the quartz crystal, the ellipse forming the envelope of the inverse phase velocity vectors, the direction of the vectors defining the direction of the phase velocity, and the magnitude of the vectors being $1/V_p$. The group velocity vectors are normal to the tangent of the elliptical envelope at any selected point on the ellipse, and thus the group velocity vectors are parallel to the phase velocity vectors along the major and minor axes of the ellipse and at an angle thereto at all other points. The major axis of the ellipse is located approximately +32.3° from the Y-axis of the quartz crystal. This would suggest that if a filter body were cut from a quartz crystal such that the longitudinal axis of the filter body lies in the Y-Z plane of the quartz crystal and along a direction +32.3° from the Y-axis of the crystal, the group velocity vector and phase velocity vector would travel collinearly with the optical beam along the longitudinal axis of the filter body. This collinearity of optical beam and group and phase velocity of the acoustic wave should result in the enhanced resolution and increased optical aperture desired.

However, in operating at this new crystal cut, a problem is encountered with birefringence and this can be understood by referring to FIG. 3 which is a diagrammatic illustration of the indices of refraction for quartz, the outer ellipse representing the index of refraction, $n_e$, for the extraordinary light wave and the center circle representing the index of refraction, $n_o$, for the ordinary light wave. The diagram is not to scale since the indices $n_e$ and $n_o$ are substantially closer together than shown, the ratio of $n_e$ to $n_o$ being approximately 1.006. The rates of change of the indices of refraction are represented by the tangents to the envelopes shown. The rate of change of the birefringence of the crystal is equal to the difference in the rates of change of the indices of refraction, and, hence, to the difference of the slopes of the tangents to the envelopes. It is seen that on the Y-axis the tangents to the two curves are parallel and, hence, have the same slope. Therefore, for this orientation, the rate of change of the birefringence is zero, and there is no further degrading of the operation of the filter due to birefringence effects.

However, at an angle of +32.3° from the Y-axis, it can be seen that the tangents are no longer parallel but indeed are widely divergent so that the rate of change with angle of the birefringence is quite high and so that very small changes in the optical angle of incidence at this particular crystal cut result in relatively large changes in birefringence. This results in large changes in the optical bandpass as the input optical aperture angle 13 increased. For example, in one version of this orientation constructed and tested, the bandpass for collimated, monochromatic light from a He-Ne laser at 6,328 A was approximately 4 A wide. When the angular aperture was opened up from essentially zero to 1-½°, the bandwidth increased to 140 A due to the birefringence change mentioned above.

Thus, while the selected orientation provides the desired collinearity between acoustic group and phase velocity vectors, the optical birefringence varies rapidly with the light propagation direction, thereby cancelling any gain achieved by the improved acoustic collinearity and degrading the resolution for all but a very small aperture angle. It is therefore most desirable to determine a crystal orientation for the filter body which takes into account the desire to move toward collinearity between the acoustic group and phase velocity vectors while at the same time avoiding the effect of variation in birefringence with light propagation direction, hopefully obtaining an orientation where the two effects will balance each other out, rendering a high resolution filter usable with relatively wide optical aperture angles.

Consider the variation of the acoustic frequency for a fixed optical wavelength as the direction of the input light vector ($\vec{k}_{L1}$) is varied. Referring to FIG. 4, the k-vector matching conditions (for the light vector $\vec{k}_{L1}$ collinear with the acoustic group velocity vector $\vec{V}_a$) can be written as:

$$k_{L1} = k_{L2} \cos \theta_o + k_a \cos \theta_{gp} \qquad (2)$$

and $$k_{L2} \sin \theta_o = k_a \sin \theta_{gp} \qquad (3)$$

where $k_{L1}$ and $k_{L2}$ represent the input and output light rays, which are orthogonally polarized. For all cases of interest $\vec{k}_{L1}$ and $\vec{k}_{L2}$ are very nearly collinear so that $\theta_o$ is extremely small, as seen from Equation (3). Therefore, $\cos \theta_o \approx 1$, and Equation (2) becomes $$k_{L1} \approx k_{L2} + k_a \cos \theta_{gp} \qquad (4)$$

giving $$n_1 k_{vac} \approx n_2 k_{vac} + k_a \cos \theta_{gp} \qquad (5)$$

where $k_{vac} = 2\pi/\lambda$, $\lambda$ = optical wavelength in vacuum,
$k_a = 2\pi f_a/V_p$, $f_a$ = acoustic frequency, $V_p$ = acoustic phase velocity, and
$n_1$ and $n_2$ are the indices of refraction for the input and output plane polarized light waves. Therefore, Equation 5 can be rewritten as $$f_1 = V_p/\cos \theta_{gp} (\Delta n/\lambda) \qquad (6)$$

where $\Delta n = n_1 - n_2$ = the effective birefringence, which is a function of the particular orientation.

First consider varying the input light direction through a small angle $\alpha_1$ in the plane formed by the acoustic group and phase velocity vectors, as shown in FIG. 5. The k-vector matching condition now leads to $$f_a = V_p/\cos(\theta_{gp} + \alpha_1) [\Delta n(\alpha_1)/\lambda] \qquad (7)$$

Now consider varying the input light direction through a small angle $\alpha_2$ perpendicular to the plane of the acoustic group and phase velocities, as shown in FIG. 6, where $k_{L2}' = k_{L2} \cos \theta_o$ and $k_a' = k_a \cos \theta_{gp}$. Here, $k_{L2}'$ and $k_a'$ are the projections of $k_{L2}$ and $k_a$ in the plane that contains $K_{L1}$ and that is and orthogonal to the plane of FIG. 4. For phase matching $$k_{L1}' = k_{L2}' \cos \theta' + k_a' \cos \alpha_2$$
$$= k_{L2} \cos \theta_o \cos \theta' + k_a \cos \theta_{gp} \cos \alpha_2$$

Using the following approximations
$\cos \theta_o \approx 1$ and $\theta' < \alpha_2/500$
so that
$\cos \theta' \approx 1$ for reasonable values of $\alpha_2$
gives
$k_{L1}' \approx k_{L2} + k_a \cos \theta_{gp} \cos \alpha_2$
In the limit $(1 - \cos \alpha_2) << (1 - \cos \theta_{gp})$
giving $k_{L1}' = k_{L2} + k_a \cos \theta_{gp}$
Therefore, to the first order, the angle between the acoustic and optical k-vectors does not change, leading to the equation:

$$f_a = V_p/\cos \theta_{gp} \Delta n(\alpha_2)/\lambda \qquad (8)$$

Note that in both Equations (7) and (8) the acoustic phase velocity, $V_p$, remains constant independent of the angle $\alpha_1$ or $\alpha_2$.

The optimum orientation is that which allows the light direction to be moved through small angles around the acoustic group velocity direction, while keeping the acoustic frequency fixed (for a given light wavelength), i.e., $$\delta f_a/\delta \alpha \mid_{\lambda\ fixed} = 0$$

For the case of the light direction varying in the "acoustic plane," Equation (7) leads to $$\delta f_a/\delta \alpha_1 = V_a/\lambda [\Delta n(\alpha_1) \delta/\delta\alpha_1 (1/\cos(\theta_{gp} + \alpha_1)) + 1/\cos(\theta_{gp} + \alpha_1)(\delta/\delta\alpha_1) \Delta n(\alpha_1)] \qquad (9)$$

Therefore
$\delta f_a/\delta \alpha_1 \mid_{\lambda\ =\ const.} = 0$
leads to $$(1/\Delta n) \delta/\delta \alpha_1 [\Delta n(\alpha_1)] = -\tan \theta_{gp} \qquad (10)$$

Similarly, for the case of the light direction varying perpendicularly to the "acoustic plane," one gets
$$\delta/\delta \alpha_2 [\Delta n(\alpha_2)] = 0 \qquad (11)$$

To satisfy Equations (10) and (11) requires specific expressions for the birefringence as a function of light propagation direction and for the angle, $\theta_{gp}$, between the acoustic group and phase velocity vectors as a function of the acoustic group velocity direction.

To evaluate the birefringence, the indices of refraction must be expressed as a function of crystal geometry and light propagation direction. For biaxial crystal (triclinic, monoclinic, orthorhombic), the convention for defining the X Y Z axes is that $n_x < n_y < n_z$.

With this convention, there are two optic axes symmetric to the Z-axis and lying in the X–Y plane, as shown in FIG. 7, with $\beta$ given by $$\tan \beta = \pm \sqrt{\frac{\frac{1}{n_x^2} - \frac{1}{n_y^2}}{\frac{1}{n_y^2} - \frac{1}{n_z^2}}} \qquad (12)$$

For a light k-vector propagating in a general direction, there are two linearly polarized normal modes, with indices of refraction given by:

$$1/n_\pm^2 = \tfrac{1}{2}\,[(1/n_x^2 + 1/n_z^2) + (1/n_x^2 - 1/n_z^2)\cos(\theta_1 \pm \theta_2)] \qquad (13)$$

where $\theta_1$ and $\theta_2$ are the angles between the light k-vector, $\vec{k}_L$, and the two optic axes. These angles are defined by:

$\cos\theta_1 = [(k_L)_x/k_L]\sin\beta + [(k_L)_z/k_L]\cos\beta$
$\cos\theta_2 = -[(k_L)_x/k_L]\sin\beta + [(k_L)_z/k_L]\cos\beta$ For the cases of interest in constructing tunable filters, the indices are approximately equal, and Equation (13) can be reduced to give $$\Delta n = n_+ - n_- \approx (n_z - n_x)\sin\theta_1 \sin\theta_2 \qquad (14)$$

For uniaxial crystals, $\beta = 0$ and $\theta_1 = \theta_2$; therefore, Equation (13) reduces to:

$$1/n_e'^2 = \sin^2\theta/n_e^2 + \cos^2\theta/n_o^2\,;\ 1/n_o'^2 = 1/n_o^2 \qquad (15)$$

where $\theta$ is the angle between $\vec{k}_L$ and the Z-axis, and $n_o$ and $n_e$ are defined as the ordinary and extraordinary indices, respectively. Similarly, Equation (14) becomes:

$$\Delta n_{uni} \approx (n_e - n_o)\sin^2\theta \qquad (16)$$

Equations (10) and (11) must be solved using the expressions for $\Delta n$ versus angle given above. Since Equation (11) is not concerned with the acoustic properties, it can be considered now. Equation (11) means that the direction of $\vec{k}_L$ must be varied with $\Delta n$ remaining fixed to first order. For the biaxial case both $\theta_1$ and $\theta_2$ must remain fixed, indicating that the k-vector must lie in the X–Y plane, with the angular variation, $\alpha_2$, being perpendicular to the X–Z plane. For the uniaxial case, the angular variation, $\alpha_2$, must be tangent to a cone around the Z-axis, i.e., perpendicular to the plane formed by $\vec{k}_L$ and the Z-axis.

Now the solution to Equation (10) must be considered in light of the above restrictions. Specifically, Equation (10) must be solved for motion of the light k-vector in the plane formed by $\vec{k}_L$ and $\hat{Z}$, with the additional restriction in the biaxial case that $\vec{k}_L$ lie in the X–Z plane.

To now evaluate the angle, $\theta_{gp}$, between the acoustic group and phase velocity vectors, one must consider the acoustic equations of motion. As an example, consider the uniaxial crystals quartz ($SiO_2$) and lithium niobate ($LiNbO_3$), which have trigonal symmetry. For both crystals, the pure shear mode in the Y–Z plane can be considered, giving the "slowness" equation $$k_a/\omega = \sqrt{\rho}\,(C_{66}\sin^2\theta_p + C_{44}\cos^2\theta_p + C_{14}\sin^2\theta_p)^{-1/2} \qquad (17)$$

where $\theta_p$ = angle between $\vec{k}_a$ and $\hat{Z}$-axis and $\rho$ = density. For quartz, piezoelectric effects alter Equation (17) slightly, and the effect on the final result will be mentioned below. The group velocity is defined by $$\vec{V}_g = \hat{X}(\delta\omega/\delta k_x^a) + \hat{Y}(\delta\omega/\delta k_y^a) + \hat{Z}(\delta\omega/\delta k_z^a) \qquad (18)$$

In the Y–Z plane, $\delta\omega/\delta k_x = 0$, and Equation (18) leads to $$\theta_g = \tan^{-1}[(\delta\omega/\delta k_y)/(\delta\omega/\delta k_z)] \qquad (19)$$

Substituting Equation (17) into Equation (19) yields an expression for the angle, $\theta_g$, between the group velocity vector and the Z-axis shown in FIG. 8:

$$\theta_g = \tan^{-1}[(C_{66}\tan\theta_p + C_{14})/(C_{44} + C_{14}\tan\theta_p)] \qquad (20)$$

Inverting Equation (20) gives $\theta_p = \tan^{-1}[(C_{44}\tan\theta_g - C_{14})/(C_{66} - C_{14}\tan\theta_g)]$
$\theta_{gp} = \theta_g - \theta_p = \theta_g - \tan^{-1}[(C_{44}\tan\theta_g - C_{14})/(C_{66} - C_{14}\tan\theta_g)]$ (21)

For the uniaxial case Equations (16) and (21) can be substituted in Equation (10). Now $\Delta n(\alpha_1) = (n_e - n_o)\cos^2\alpha_1$, and evaluating the derivative in Equation (10) at $\alpha_1 = \theta_g$ gives $$\frac{1}{(n_e - n_o)}\cos^2\theta_g \frac{\partial}{\partial\alpha_1}[(n_e - n_o)\sin^2\alpha_1]|_{\alpha_1=\theta_g}$$
$$= -\tan\left[\theta_g - \tan^{-1}\left(\frac{C_{44}\tan\theta_g - C_{14}}{C_{66} - C_{14}\tan\theta_g}\right)\right] \qquad (22)$$

Equation (22) can now be solved for $\theta_g$ using the specific constants for quartz. At 4,000 Å, $n_0 = 1.56$, $n_0 = 1.57$, $C_{44} = 5.79 \times 10^{10}$ Nt/m², $C_{14} = -1.81 \times 10^{10}$ Nt/m², and $C_{56} = 4.06 \times 10^{10}$ Nt/m². $\theta_g$ is found to be $-101.13°$, or $-11.13°$ from the Y-axis. Including piezo-electric terms gives a more exact answer of $-11.20°$, as shown in FIG. 9. This angle is found to be relatively independent of wavelength in the region of crystal transparency.

Referring now to FIG. 10, there is shown a quartz filter body 11 for use in the filter of FIG. 1, this body being oriented in a direction approximately $-11.20°$ relative to the Y-axis. In the nomenclature adopted by IEEE in The Standards on Piezoelectric Crystals, IEEE 176 – 1949, this direction is designated $(zyw) - 11.20°$. In actual practice, good results are obtained when the crystal cut lies within the range of $(zyw) - 11.10°$ to $(zyw) - 11.30°$.

As described in detail in the above-cited U. S. Pat. No. 3,687,521, the face angle $\gamma$ of the Quartz crystal 11 (i.e. the angle between the input face normal and the longitudinal axis of the crystal) may be calculated from the following equation:

$$\cos\gamma = (V_{p1}/V_{p2})\sin(\gamma + \delta) \qquad (23)$$

where $V_{p1}$ is the phase velocity of the acoustic wave in the crystal 11 along the path between the acoustical transducer 18 and the input face 12 of the crystal, $V_{p2}$ is the phase velocity of the acoustic wave in the crystal 11 along the longitudinal axis of the crystal, and $\delta$ is the walk-off angle between the group and phase velocity vectors of the acoustic wave as shown in FIG. 1 of this application. Substituting the values of $V_{p1}$, $V_{p2}$, and $\delta$ for the orientation shown in FIG. 10 of this application in equation (23) gives:

$\cos \gamma = (4.36 \times 10^5 \text{ cm/sec}/3.62 \times 10^5 \text{ cm/sec}) \sin (\gamma + 21.79°)$ From this expression it may be determined that $\gamma = 26.26°$.

Thus, the face angle for quartz, if cut at approximately 26.26° will result in the group velocity vector for the acoustic wave lying along the longitudinal axis of the quartz body, rendering optimized interaction with the optical wave.

With this orientation, the effect of the variation in birefringence cancels the effect due to acoustic anisotropy, and high resolution is obtained with the filter even at large aperture angles. For example, in one embodiment of the invention constructed and tested, the quartz filter operated at 6,328 A with a bandwidth of approximately 3 A and with an optical aperture angle of 4°. This compares very favorably with a prior form of optical filter shown in FIG. 1 with the propagation down the Y-axis of the crystal wherein at 6,328 A the bandwidth obtained was 20 A for an aperture angle of 1°.

For a lithium niobate crystal utilizing light in the IR region, a crystal cut is chosen such that the longitudinal axis of the body 11 along which the group velocity vector of the acoustic wave is directed extends along the direction of approximately 4.0° from the Y-axis of the crystal, i.e., (zyw) 4.0°. The phase velocity vector extends along a direction of approximately −3.6°. The face angle is cut at approximately 51.6°.

We claim:

1. A method for diffracting light from a first polarization to a second polarization, said method comprising the steps of passing light of the first polarization into an acoustically anisotropic, optically birefringent quartz crystal medium and along a major axis thereof extending in the Y-Z crystal plane at an angle of approximately −11.2° relative to the crystalline Y axis, and producing an acoustical wave in the quartz crystal medium and directing the group velocity vector of the acoustical wave collinearly with the light of the first polarization along said major axis of the quartz crystal medium, thereby diffracting light of the first polarization to the second polarization within the quartz crystal medium.

2. A method for diffracting light from a first polarization to a second polarization, said method comprising the steps of passing light of the first polarization into an acoustically anisotropic, optically birefringent lithium niobate crystal medium and along a major axis thereof extending in the Y-Z crystal plane at an angle of approximately 4° relative to the crystalline Y axis, and producing an acoustical wave in the lithium niobate crystal medium and directing the group velocity vector of the acoustical wave collinearly with the light of the first polarization along said major axis of the lithium niobate crystal medium, thereby diffracting light of the first polarization to the second polarization within the lithium niobate crstal medium.

3. An acousto-optic filter body of crystalline quartz with an aconsto-optic interaction axis along which an optical beam and the group velocity vector of an acoustic wave are to be directed, said axis lying in the Y-Z crystal plane at an angle of approximately −11.2° from the crystalline Y axis.

4. An acousto-optic flter body of crystalline lithium niobate with an aconsto-optic interaction axis along which an optical beam and the group velocity vector of an acoustic wave are to be directed, said axis lying in the Y-Z crystal plane at an angle of approximately 4° from the crystalline Y axis.

5. Apparatus for diffracting light from a first polarization to a second polarization, said apparatus comprising an acoustically anisotropic, optically birefringent body of quartz having a longitudinal axis lying in the Y-Z crystal plane at an angle of approximately −11.2° from the crystalline Y axis, means for passing light of the first polarization into said body along said longitudinal axis, means for producing an acoustical wave in said body, and means for directing the acoustical wave and the light in said body such that the group velocity vector of the acoustical wave is substantially collinear with the path of the light in said body, thereby diffracting light of the first polarization to the second polarization within said body.

6. Apparatus as in claim 5 wherein said means for producing an acoustical wave in said body comprises an acoustical transducer bonded to said body.

7. Apparatus for diffracting light from a first polarization to a second polarization, said apparatus comprising an acoustically anisotropic, optically birefringent body of lithium niobate having a longitudinal axis lying in the Y-Z crystal plane at an angle of approximately 4° from the crystalline Y axis, means for passing light of the first polarization into said body along said longitudinal axis, means for producing an acoustical wave in said body, and means for directing the acoustical wave and the light in said body such that the group velocity vector of the acoustical wave is substantially collinear with the path of the light in said body, thereby diffracting light of the first polarization to the second polarizaion within said body.

8. A method for diffracting light from a first polarization to a second polarization, said method comprising the steps of passing light of the first polarization into an acoustically anisotropic, optically birefringent medium along the longitudinal axis thereof, and producing an acoustic wave in the medium with a group velocity vector of the acoustic wave being directed along said longitudinal axis, the light and acoustic wave frequencies $f_o$ and $f_a$, respectively, being related by $f_o = c f_a/V |\Delta n|$ where $c/V$ is the ratio of the light velocity in vacuum to the acoustic group velocity in the medium, and $\Delta n$ is the birefringence of the medium, the improvement comprising the step of providing the medium with a crystal orientation along said longitudinal axis such that the effect due to acoustic anisotropy in the crystal is offset by the effect of the variation in birefringence with light propagation direction, resulting in relatively wide optical apertures without appreciable degradation in resolution.

9. The method of claim 8 wherein said medium is quartz and said longitudinal axis lies in the Y-Z crystal plane of the quartz medium at an angle of approximately −11.2° from the crystalline Y axis of the quartz medium.

10. The method of claim 8 wherein said medium is lithium niobate and said longitudinal axis lies in the Y-Z crystal plane of the lithium niobate medium at an angle of approximately 4° from the Y axis of the lithium niobate medium.

11. Apparatus for diffracting light from a first polarization to a second polarization, said apparatus comprising an acoustically anisotropic, optically birefringent crystal body having a longitudinal axis oriented at a selected non-zero angle from the X-Y plane of said crystal body, means for passing light of the first polarization into said crystal body along said longitudinal axis, means for producing an acoustical wave in said crystal body, and means for directing the acoustical wave and the light in said crystal body such that the group velocity vector of the acoustical wave is substantially collinear with the path of the light in said crystal body, the light of the first polarization being diffracted to the second polarization in said crystal body, said selected angle being determined by simultaneous solution of the two equations $$(1/\Delta n) \, \delta/\delta\alpha_1 \, [\, \Delta n \, (\alpha_1)] = -\tan \theta_{gp}$$

and $$\delta/\delta\alpha_2 \, [\, \Delta n \, (\alpha_2)] = 0 ,$$

where $\alpha_1$ is the angular variation from said longitudinal axis in the plane formed by the group and phase velocity vectors of the acoustical wave, $\alpha_2$ is the angular variation from said longitudinal axis in the plane containing said longitudinal axis and lying normal to said last-mentioned plane, $\theta_{gp}$ is the angle between the group and phase velocity vectors of the acoustical wave, and $\Delta n$ is the birefringence of said crystal body.

12. Apparatus as in claim 11 wherein said crystal body comprises quartz and said selected angle is approximately $(zyw)$ $-11.2°$, where z indicates that the direction of the thickness of said quartz body is along the crystalline Z axis of said quartz body before any rotations have been made, y indicates that the direction of the length of said quartz body is along the crystalline Y axis of said quartz body before any rotations have been made, and w indicates that the direction of the width of said quartz body is the axis of first rotation.

13. Apparatus as in claim 11 wherein said crystal body comprises lithium niobate and said selected angle is approximately $(zyw)$ 4°, where z indicates that the direction of the thickness of said lithium niobate body is along the crystalline Z axis of said lithium niobate body before any rotations have been made, y indicates that the direction of the length of said lithium niobate body is along the crystalline Y axis of said lithium niobate body before any rotations have been made, and w indicates that the direction of the width of said lithium niobate body is the axis of first rotation.

14. Apparatus for diffracting light from a first polarization to a second polarization, said apparatus comprising an acoustically anisotropic, optically birefringent crystalline medium, means for directing light of the first polarization into said medium along an axis hereof, means for producing an acoustical wave having noncollinear group and phase velocity vectors in said medium and for directing the group velocity vector of the acoustical wave substantially collinearly with the light along said axis to diffract light of the first polarization to the second polarization, the frequency $f_o$ of the light and the frequency $f_a$ of the acoustical wave being related by the relationship $f_o = c f_a / V |\Delta n|$, where $C/V$ is the ratio of the velocity of light in a vacuum to the group velocity of the acoustical wave in said medium and $\Delta n$ is the birefringence of said medium, said medium having a crystal orientation along said axis for which the effect upon the optical bandwidth of said apparatus due to the acoustical anisotropy of said medium is offset by the effect upon the optical bandwidth of said apparatus due to a variation in the optical birefringence of said medium in the direction of propagation of the light along said axis.

15. Apparatus as in claim 14 wherein said medium is quartz, and said axis lies in the Y-Z crystal plane of said quartz medium at an angle of approximately $-11.2°$ from the crystalline Y axis of said quartz medium.

16. Apparatus as in claim 14 wherein said medium is lithium niobate, and said axis lies in the Y-Z crystal plane of said lithium niobate medium at an angle of approximately 4° from the Y axis of said lithium niobate medium.

17. Apparatus as in claim 14 wherein said axis is oriented at a non-zero angle from the X-Y plane of said medium, and said angle is determined by simultaneous solution of the following two equations:

$$(1/\Delta n) \, (\delta/\delta\alpha_1) \, [\, \Delta n \, (\alpha_1)] = -\tan \theta_{gp}$$
$$\delta/\delta\alpha_2 \, [\, \Delta n \, (\alpha_2)] = 0,$$

where $\alpha_1$ is the angular variation from said axis in the plane formed by the group and phase velocity vectors of the acoustical wave, $\alpha_2$ is the angular variation from said axis in the plane containing said axis and lying normal to said last-mentioned plane, $\theta_{gp}$ is the angle between the group and phase velocity vectors of the acoustical wave, and $\Delta n$ is the birefringence of said medium.

18. An acousto-optic filter comprising an acoustically anisotropic, optically birefringent crystalline medium, means for directing light of a first polarization into said medium along an axis thereof, mean for producing an acoustical wave having noncollinear group and phase velocity vectors in said medium and for directing the group velocity vector of the acoustical wave substantially collinearly with the light along said axis to diffract at least some light of the first polarization to a second polarization, said medium having a crystal orientation along said axis for which the effect upon the optical bandwidth of said filter due to the acoustical anisotropy of said medium is offset by the effect upon the optical bandwidth of said filter due to a variation in the optical birefringence of said medium in the direction of propagation of the light along said axis, and means for separating light of the first and second polarizations.

19. An acousto-optic filter as in claim 18 wherein said medium is quartz, and said axis lies in the Y-Z crystal plane of said quartz medium at an angle of approximately $-11.2°$ from the crystalline Y axis of said quartz medium.

20. An acousto-optic filter as in claim 18 wherein said medium is lithium niobate, and said axis lies in the Y-Z crystal plane of said lithium niobate medium at an angle of approximately 4° from the Y axis of said lithium niobate medium.

21. An acousto-optic filter as in claim 18 wherein said axis is oriented at a non-zero angle from the X-Y plane of said medium, and said angle is determined by simultaneous solution of the following two equations:

$$(1/\Delta n) \, (\delta/\delta\alpha_1) \, [\, \Delta n \, (\alpha_1)] = -\tan \theta_{gp}$$
$$\delta/\delta\alpha_2 \, [\, \Delta n \, (\alpha_2)] = 0 ,$$

where $\alpha_1$ is the angular variation from said axis in the plane formed by the group and phase velocity vectors of the acoustical wave, $\alpha_2$ is the angular variation from said axis in the plane containing said axis and lying normal to said last-mentioned plane, $\theta_{gp}$ is the angle between the group and phase velocity vectors of the acoustical wave, and $\Delta n$ is the birefringence of said medium.

22. A method for diffracting light from a first polarization to a second polarization, said method comprising the steps of passing light of the first polarization into an acoustically anisotropic, optically birefringent crystalline medium along an axis for which the effect upon optical bandwidth due to the acoustical anisotropy of the medium is offset by the effect upon optical bandwidth due to a variation in the optical birefringence of the medium in the direction of propagation of the light along said axis, and producing an acoustical wave having noncollinear group and phase velocity vectors in the medium and directing the group velocity vector of the acoustical wave collinearly with the light of the first polarization along said axis to diffract light of the first polarization to the second polarization within the medium.

23. An acousto-optic filter body of crystalline quartz having an acousto-optic interaction axis lying in the Y–Z crystal plane at an angle of approximately $-11.2°$ from the crystalline Y axis.

24. An acousto-optic filter body of crystalline lithium niobate having an acousto-optic interaction axis lying in the Y–Z crystal plane at an angle of approximately 4° from the crystalline Y axis.

25. An acousto-optic filter body of crystalline quartz as in claim 23 also having a longitudinal axis lying in the Y–Z crystal plane at an angle of approximately $-11.2°$ from the crystalline Y axis.

26. An acousto-optic filter body of crystalline lithium niobate as in claim 24 also having a longitudinal axis lying in the Y–Z crystal plane at an angle of approximately 4° from the crystalline Y axis.

* * * * *

UNITED STATES PATENT OFFICE
CERTIFICATE OF CORRECTION

Patent No. 3,756,689          Dated September 4, 1973

Inventor(s) Donald L. Hammond, John A. Kusters & David A. Wilson

It is certified that error appears in the above-identified patent and that said Letters Patent are hereby corrected as shown below:

Column 6, line 13, in Equation (6) "$f_1$" should read -- $f_a$ --; line 53, that portion of the equation reading "$\delta f_a/\delta\alpha$" should read -- $\partial f_a/\partial\alpha$ --; lines 56-57, in Equation (9): that portion reading "$\delta f_a/\delta\alpha_1$" should read -- $\partial f_a/\partial\alpha_1$ --, and those portions reading "$\delta/\delta\alpha_1$" (two occurrences) should read -- $\partial/\partial\alpha_1$ --; line 60, that portion of the equation reading "$\delta f_a/\delta\alpha_1$" should read -- $\partial f_a/\partial\alpha_1$ --; line 62, that portion of Equation (10) reading "$\delta/\delta\alpha_1$" should read -- $\partial/\partial\alpha_1$ --; line 66, that portion of Equation (11) reading "$\delta/\delta\alpha_2$" should read -- $\partial/\partial\alpha_2$ --;

Column 8, line 14, Equation (18) should read --

$$\vec{V}_g = \hat{X}(\partial\omega/\partial k_x) + \hat{Y}(\partial\omega/\partial k_y) + \hat{Z}(\partial\omega/\partial k_z) \quad --;$$

line 16, "$\delta\omega/\delta k_x = 0$" should read -- $\partial\omega/\partial k_x = 0$ --; line 18, Equation (19) should read --

$$\theta_g = \tan^{-1}[(\partial\omega/\partial k_y)/(\partial\omega/\partial k_z)] \quad --;$$

line 27, before "$\theta_{gp}$" insert -- Thus, --; line 42, "$n_o = 1.57$" should read -- $n_e = 1.57$ --; line 43, "$C_{56}$" should read -- $C_{66}$ --;

Column 9, line 67, "crstal" should read -- crystal --;

UNITED STATES PATENT OFFICE
CERTIFICATE OF CORRECTION

Patent No. 3,756,689           Dated September 4, 1973

Inventor(s) Donald L. Hammond, John A. Kusters & David A. Wilson

It is certified that error appears in the above-identified patent and that said Letters Patent are hereby corrected as shown below:

Column 10, lines 1 and 7, "aconsto-optic" should read -- acousto-optic --; line 6, "flter" should read -- filter --;

Column 11, line 22, that portion of the equation reading "$\delta/\delta\alpha_1$" should read -- $\partial/\partial\alpha_1$ --; line 24, that portion of the equation reading "$\delta/\delta\alpha_2$" should read -- $\partial/\partial\alpha_2$ --; line 66, "C/V" should read -- c/V --;

Column 12, line 23, that portion of the equation reading "$(\delta/\delta\alpha_1)$" should read -- $(\partial/\partial\alpha_1)$ --; line 24, that portion of the equation reading "$\delta/\delta\alpha_2$" should read -- $\partial/\partial\alpha_2$ --; line 36, "mean" should read -- means --; line 64, that portion of the equation reading "$(\delta/\delta\alpha_1)$" should read -- $(\partial/\partial\alpha_1)$ --; line 65, that portion of the equation reading "$\delta/\delta\alpha_2$" should read -- $\partial/\partial\alpha_2$ --;

Column 13, line 7, "difracting" should read -- diffracting --.

Signed and sealed this 9th day of April 1974.

(SEAL)
Attest:

EDWARD M. FLETCHER, JR.
Attesting Officer

C. MARSHALL DANN
Commissioner of Patents